US012709907B2

(12) United States Patent
Barlow et al.

(10) Patent No.: US 12,709,907 B2
(45) Date of Patent: Aug. 18, 2026

(54) APPARATUS FOR ALIGNING CORRUGATED DECKING

(71) Applicant: Innovatech Systems, LLC, Kanarraville, UT (US)

(72) Inventors: James Barlow, Kanarraville, UT (US); James Harker, Kanarraville, UT (US)

(73) Assignee: Innovatech Systems, LLC, Kanarraville, UT (US)

( * ) Notice: Subject to any disclaimer, the term of this patent is extended or adjusted under 35 U.S.C. 154(b) by 361 days.

(21) Appl. No.: 18/456,917

(22) Filed: Aug. 28, 2023

(65) Prior Publication Data

US 2024/0068253 A1 Feb. 29, 2024

Related U.S. Application Data

(60) Provisional application No. 63/373,828, filed on Aug. 29, 2022.

(51) Int. Cl.
*E04G 21/18* (2006.01)
*B23P 15/12* (2006.01)
*E04G 21/16* (2006.01)

(52) U.S. Cl.
CPC ............ *E04G 21/185* (2013.01); *B23P 15/12* (2013.01); *E04G 21/167* (2013.01)

(58) Field of Classification Search
CPC ... E04G 21/185; E04G 21/1841; E04G 21/18; E04G 21/16; E04G 21/00; E04G 21/167; E04C 2/08; E04C 2/02; E04C 2/00; E04C 2/322; E04C 2/32; E04C 2/30; B23P 15/12; B23P 15/00
USPC ........................................ 29/897.3, 897, 592
See application file for complete search history.

(56) References Cited

U.S. PATENT DOCUMENTS 3,624,876 A * 12/1971 Irvin ...................... B21D 39/00 294/119
4,072,118 A * 2/1978 Schultheiss ............. E04D 3/364 29/243.5
4,345,964 A * 8/1982 Scholander ............. E04C 2/322 156/468
4,470,186 A * 9/1984 Knudson ................. E04D 15/04 29/243.5
4,918,797 A * 4/1990 Watkins .................. E04D 3/364 29/243.5
6,760,962 B2 * 7/2004 Seamons ................. E04D 3/368 29/243.57

(Continued)

*Primary Examiner* — Lawrence Averick
(74) *Attorney, Agent, or Firm* — Gurr & Brande, PLLC; Robert A. Gurr

(57) ABSTRACT

An apparatus for aligning corrugated decking includes a main body, an alignment frame, and one or more arms configured by linear actuation to raise and lower the alignment frame. The apparatus features one or more vertically-adjustable corrugation plates and a sliding corrugation plate positioned across the alignment frame, each including a plurality of teeth that are grooved to complement the profile of corrugated panels. The sliding corrugation plate is moveable along sliding rails via a linear actuator in a header of the alignment frame. In practice, the vertically-adjustable corrugation plates grip the flutes of an unsecured panel while the sliding corrugation plate grips the flutes of an adjacent unsecured panel and aligns them together with one another in preparation for fastening.

7 Claims, 13 Drawing Sheets

(56) References Cited

U.S. PATENT DOCUMENTS

| | | | | |
|---|---|---|---|---|
| 8,507,824 | B2 * | 8/2013 | Martin | E04D 15/04<br>118/305 |
| 2003/0213112 | A1 * | 11/2003 | Seamons | E04D 15/04<br>29/243.5 |
| 2007/0199277 | A1 * | 8/2007 | Martin | E04C 5/0645<br>52/750 |

* cited by examiner 144A
142
140
138
136
134
132
146
144B

APPARATUS FOR ALIGNING CORRUGATED DECKING

CROSS-REFERENCE TO RELATED APPLICATIONS

This application claims the benefit of U.S. Provisional Application Ser. No. 63/373,828, filed on Aug. 29, 2022, which is incorporated herein by reference.

TECHNICAL FIELD

The present disclosure relates to the erection of steel structures. More particularly, the present disclosure relates to a mechanical apparatus for aligning and securing corrugated steel deck panels.

BACKGROUND

Corrugated steel deck panels provide a comparatively lightweight, yet durable, means for quickly erecting the interior structure of many warehouses and industrial buildings. The panels will not rot, split, or crack like wood, and cannot be damaged by termites and pests. Moreover, the panels are readily fastened to one another along their sides at the lap joint by way of screws, welds, or button punching standing seams. Due to these material advantages, corrugated steel deck panels are a staple in the commercial construction industry.

A modern warehouse or industrial facility may have a footprint that is tens of thousands of square feet in size. The process of installing the deck panels along the interior, however, is currently a labor-intensive operation that requires aligning a secured panel with an unsecured panel and fastening them to steel support members. The process may then be repeated thousands of times. Precise alignment of the numerous panels to create a properly fastened deck, upon which either insulation, flooring, or roofing can then be added, is a meticulous process. To function properly as a structural diaphragm that can transfer lateral loads to shear walls, the panels must be firmly secured to each other and to steel support members. Accordingly, misaligned deck panels and temporarily fastened deck panels must be readjusted, often requiring the technician to shear old pins in order to reposition and align the panels properly. The process is complicated by the fact that technicians must install the panels high off the ground while wearing fall-resistant harnesses and related safety equipment.

Thus, there is a need for an apparatus that automates the process of aligning and fastening together corrugated panels without the need to cut pins, doing so more efficiently and safely than traditional methods. The present disclosure solves these and other problems.

SUMMARY OF EXAMPLE EMBODIMENTS

In some embodiments, an apparatus for aligning corrugated decking comprises a main body, an alignment frame, and one or more arms configured by linear actuation to raise and lower the alignment frame. The apparatus for aligning corrugated decking comprises one or more vertically-adjustable corrugation plates and a sliding corrugation plate that, in some embodiments, are aligned in parallel to one another on the alignment frame. Both the one or more vertically-adjustable corrugation plates and the sliding corrugation plate comprise a plurality of teeth that are grooved to align with, and complement, the profile of corrugated panels being installed. The apparatus may comprise a header that houses a linear actuator configured to enable horizontal movement of the sliding corrugation plate back-and-forth along one or more rails housed within a header of the alignment frame.

The main body may further comprise one or more continuous tracks, a continuous track drive, and an engine or motor to propel the apparatus along corrugations of decking. The apparatus, in some embodiments, comprises a control panel, the control panel comprising a keyed ignition switch, a deck alignment control lever, a throttle, a frame vertical adjustment lever, a steering control, a handlebar, and a safety clutch. The apparatus may further comprise one or more bottom fork pockets and dedicated lift points that assist the user to lift the apparatus safely between floors during the decking installation process.

A method of using an apparatus for aligning corrugated decking, in some embodiments, comprises lowering an alignment frame onto a secured corrugated panel and an unsecured corrugated panel so that the vertically-adjustable corrugation plate engages the secured corrugated panel and the unsecured panel engages with the sliding corrugation plate, and moving the unsecured panel with the sliding corrugation plate until the two corrugated panels are aligned with one another such that the flutes or corrugations in each panel are contiguous.

DETAILED DESCRIPTION OF EXAMPLE EMBODIMENTS

Figure 1:
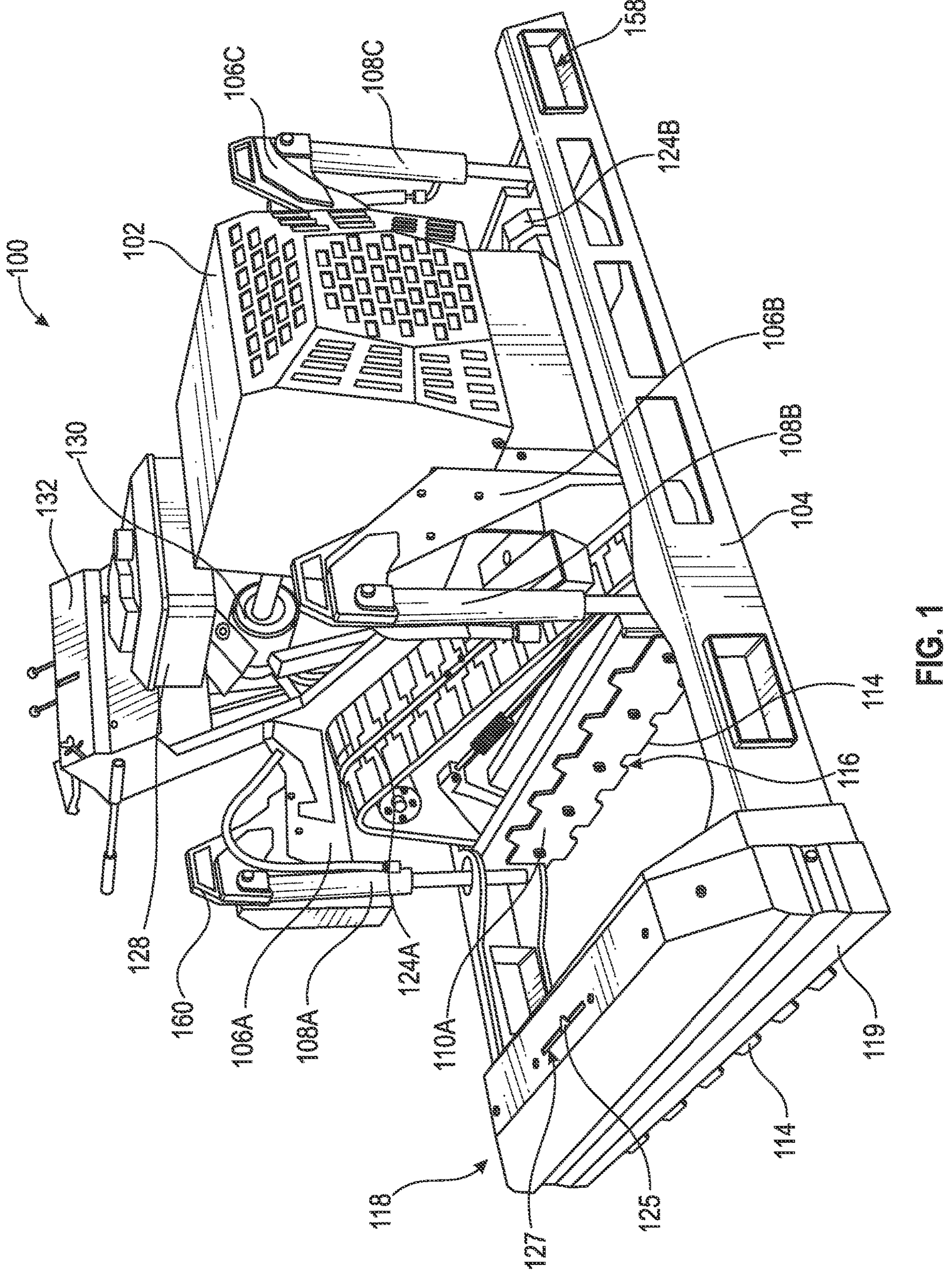
FIG. 1 is a front, right-side perspective view of an apparatus for aligning corrugated decking.
Figure 2:
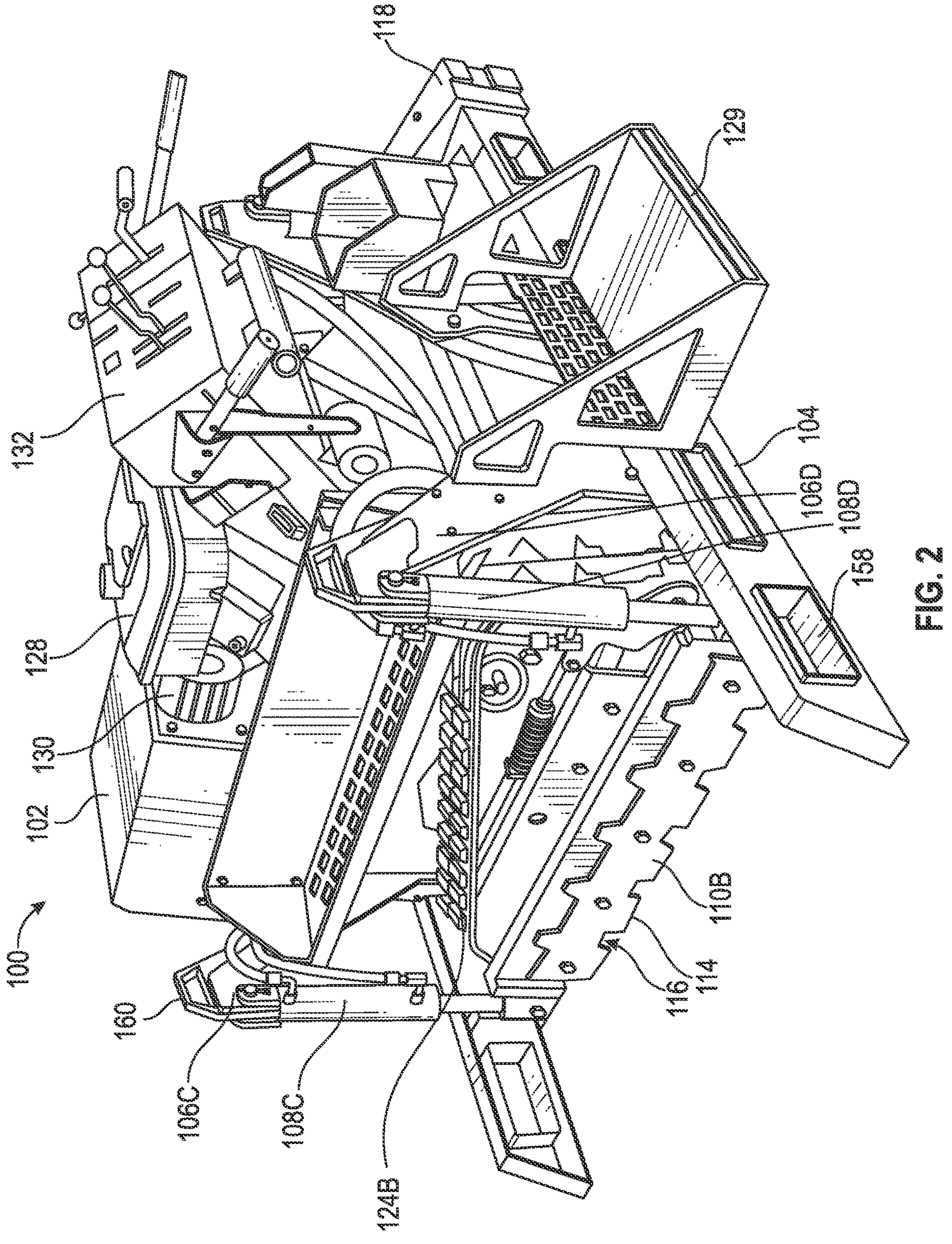
FIG. 2 is a back, left-side perspective view of an apparatus for aligning corrugated decking.
Figure 3:
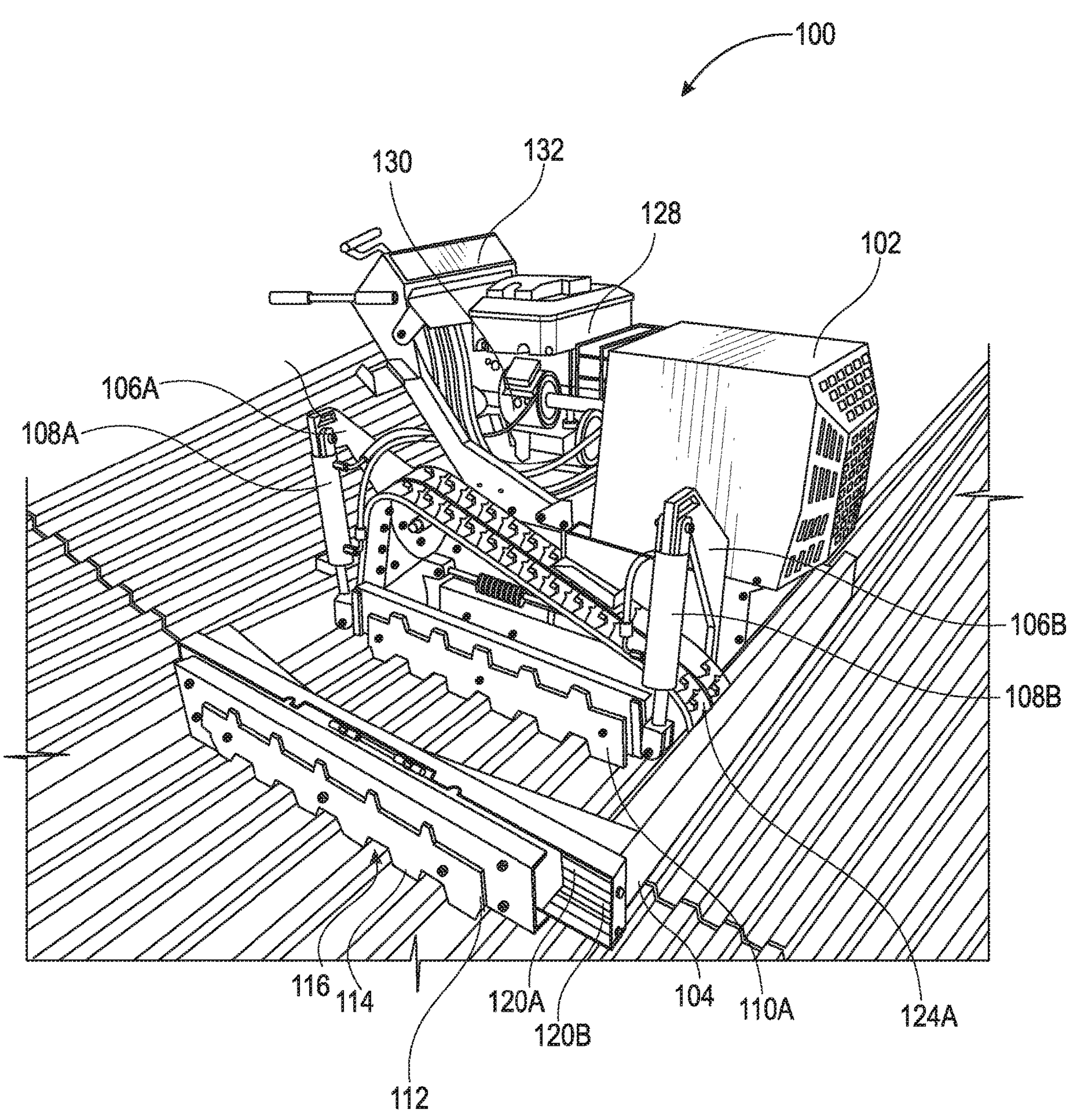
FIG. 3 is a front, right-side perspective view of an apparatus for aligning corrugated decking.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for an apparatus that automates the process of aligning and fastening together corrugated panels without the need to cut pins, doing so more efficiently and safely than traditional methods. The apparatus for aligning corrugated decking disclosed herein solves these and other problems.

As shown in FIGS. 1-12, in some embodiments, an apparatus for aligning corrugated decking 100 comprises a main body 102, an alignment frame 104, and one or more arms 106A-D configured to raise and lower the alignment frame 104 in relation to the main body 102. The alignment frame 104, without limitation, may be a rectangular railing that substantially surrounds the main body 102 of the apparatus for aligning corrugated decking 100. Each of the one or more arms 106A-D may be couplable between the main body 102 and the alignment frame 104 and may comprise a linear actuator 108A-D (e.g., hydraulic cylinder, screw drive, etc.). When extended, the linear actuators 108A-D lower the alignment frame 104 towards the ground in preparation for aligning together two adjacent corrugated panels. When retracted, the linear actuators 108A-D lift the alignment frame 104 up away from the ground in preparation to move or otherwise reposition the apparatus 100. As shown, though without limitation, there may be four arms 106A-D, wherein each of the four arms 106A-D are positioned at a different vertex of the main body 102. Placement along each vertex provides added stability and mechanical advantage during engagement of the linear actuators 108A-D, though alternative positionings and more or less arms 106A-D may be used without departing from the teachings herein.

The apparatus for aligning corrugated decking 100 comprises one or more vertically-adjustable corrugation plates 110A-B and a sliding corrugation plate 112 that, in some embodiments, are aligned in parallel to one another. Both the one or more vertically-adjustable corrugation plates 110A-B and the sliding corrugation plate 112 comprise a plurality of teeth 114 that are grooved to align with and complement the profile of the corrugated panels being installed, as will be described in more detail later herein in relation to FIG. 9. The side of each tooth of the plurality of teeth 114 may comprise friction surfaces 116 such as knurled metal patterns, coarse metal finishings, surface and edge treatments, or other alternative materials and configurations having a high coefficient of friction that grip the flutes of the corrugated panels. Corrugated panels by nature comprise flutes (i.e., folds or bends), which project downward from a parallel plane to form a repetitive trench or wave pattern in the corrugated panels. The plurality of teeth 114 have a spacing between each tooth and a depth that together enable an interference fit between the mating surfaces on the plurality of teeth 114 and the flutes of the corrugated panels. The friction surfaces 116 along the sides of the plurality of teeth 114 further enable a firm grip against the corrugated panels to assist in their movement.

Figure 4:
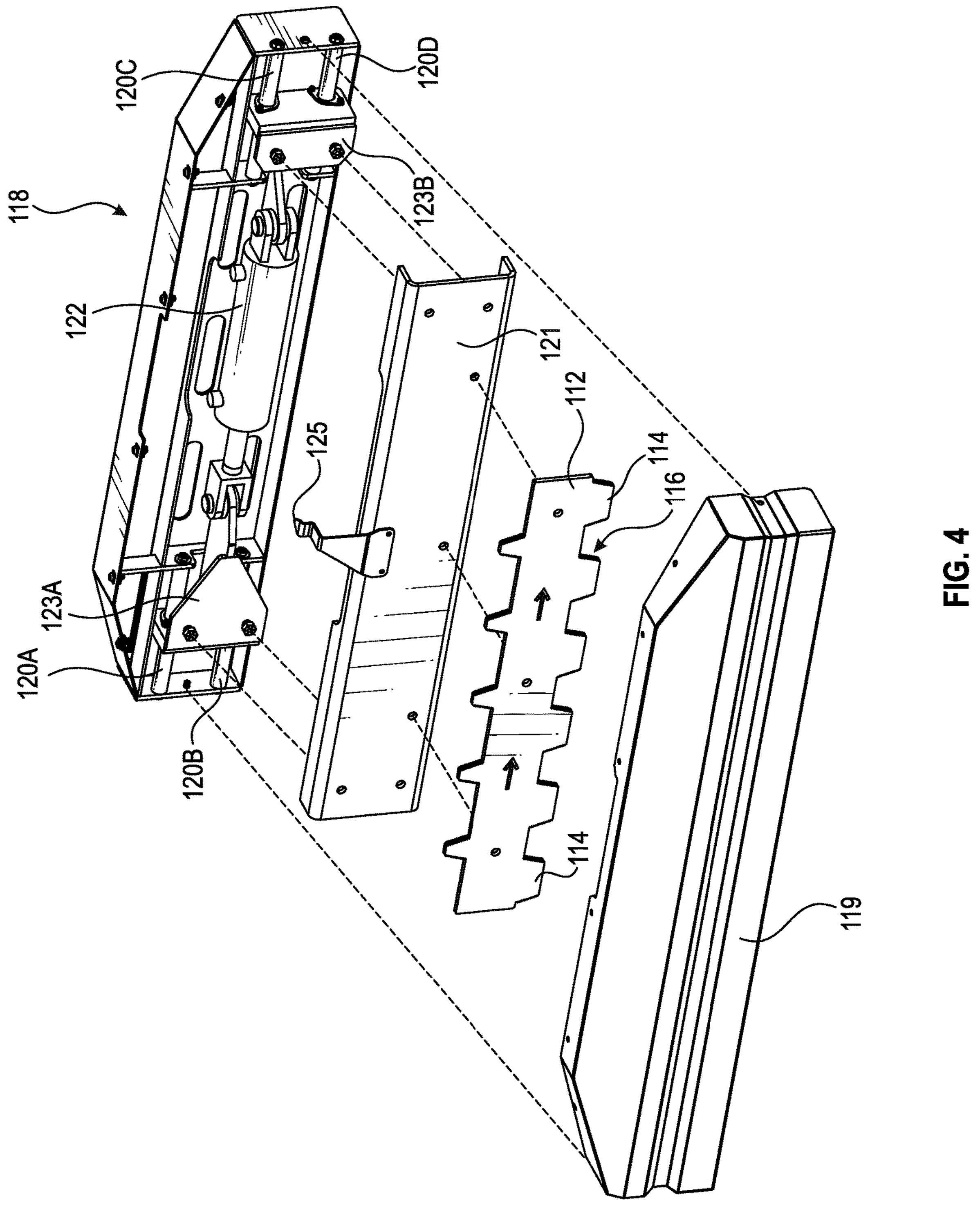
FIG. 4 is a top, right-side perspective exploded view of a header.
Figure 5:
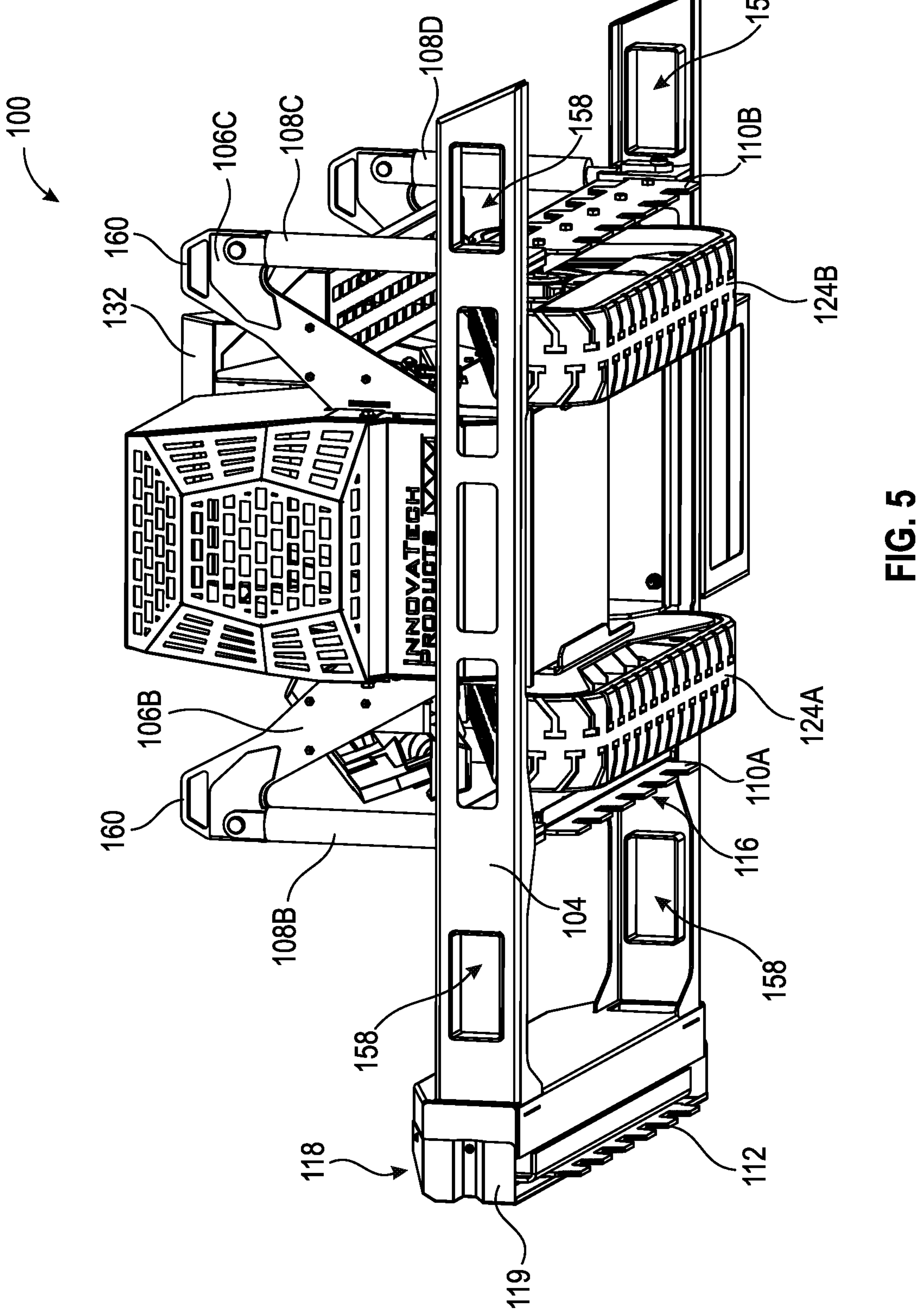
FIG. 5 is a front, bottom side perspective view of an apparatus for aligning corrugated decking.

As best seen in FIG. 4, the apparatus for aligning corrugated decking 100 comprises a header 118 positioned along an end of one side of the alignment frame 104, which may be enclosed within a housing 119 (as shown in FIG. 1). The header 118, in some embodiments, comprises one or more sliding rails 120A-D. The sliding corrugation plate 112 may be directly coupled to the one or more sliding rails 120A-B or otherwise indirectly coupled thereto by an alignment header plate 121. For example, the sliding corrugation plate 112 may be coupled (via bolts or other securement mechanisms) to a first side of the alignment header plate 121, the alignment header plate being coupled (via bolts or other securement mechanisms) to one or more bolt plates 123A-B, the one or more bolt plates 123A-B coupled to a linear actuator 122 and configured to slide on rails 120A-D respectively.

The linear actuator 122 may be of any known type, such as a hydraulic cylinder, screw drive, etc. and is configured to enable movement of the sliding corrugation plate 112 back-and-forth via the rails 120A-D. This movement assists in the alignment of corrugated deck panels, as described later herein. The apparatus for aligning corrugated decking 100 may also comprise an alignment indicator 125 that extends outside of the housing 119 (as best seen in FIG. 1) whereby the user can visually observe the movement and positioning of the sliding corrugation plate 112 at any given time. As understood, because the alignment indicator is coupled to the alignment header plate 121, it moves as the alignment header plate 121 moves in response to movement of the linear actuator 122. The alignment indicator 125 may slide within an aperture 127 of the housing 119.

Figure 6:
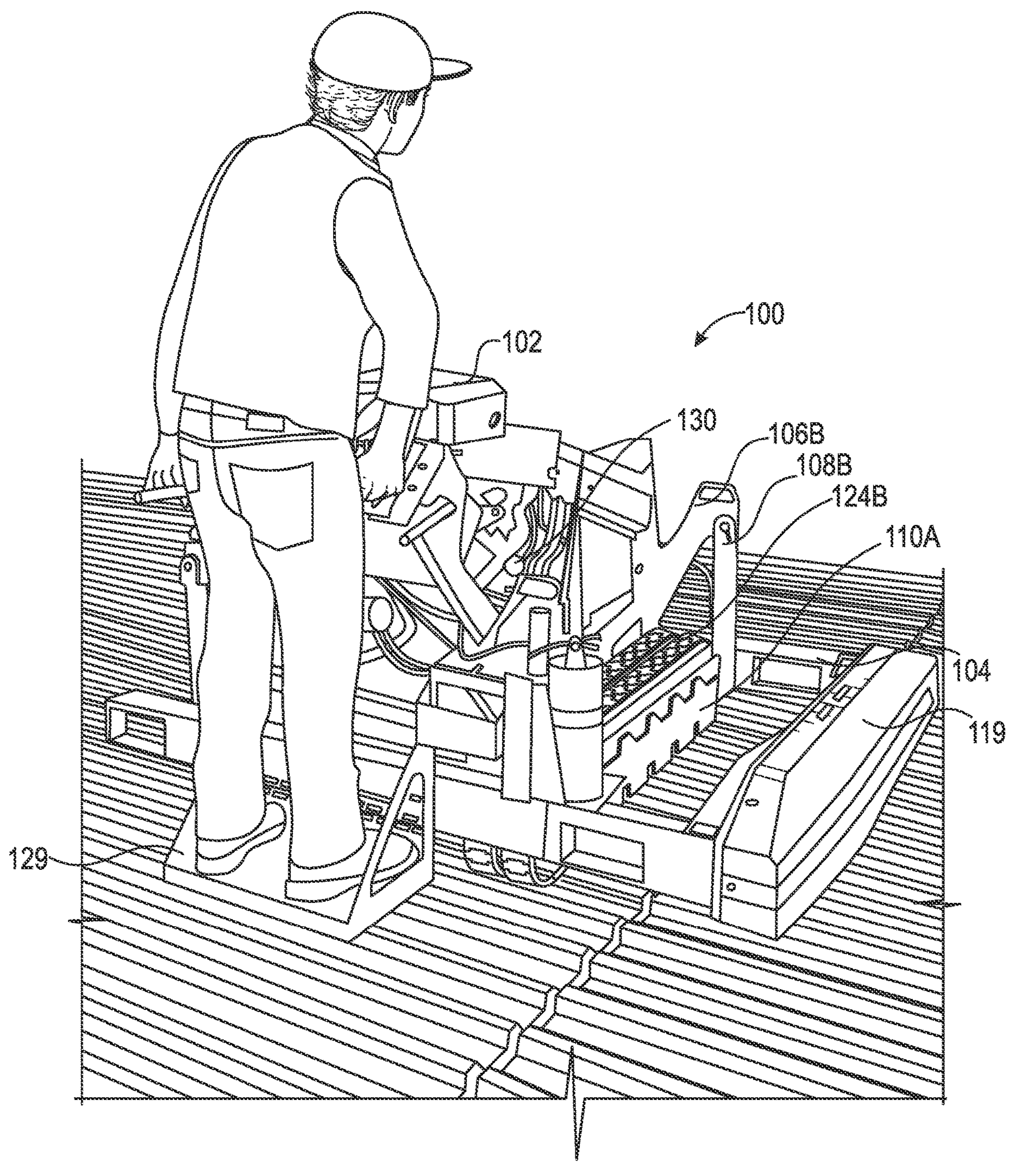
FIG. 6 is a back, right-side perspective view of an apparatus for aligning corrugated decking operated by a user.

The apparatus for aligning corrugated decking 100 further comprises one or more continuous tracks 124A-B, a continuous track drive 126, and an engine 128 or motor to drive the tracks 124A-B. The continuous tracks 124A-B may be coupled to the main body 102 of the apparatus 100 and comprise rubberized treads that are propelled forwards and backwards by the continuous track drive 126 as powered by the engine 128. The continuous tracks 124A-B feature a larger surface area than conventional tires, thereby distributing the weight of the apparatus across a surface of the corrugated panels better than steel or rubber tires on an equivalent vehicle. However, some embodiments may use tires rather than tracks. The distribution of weight enables the apparatus 100 to smoothly traverse across the flutes of the corrugated decking and do so more safely when operated on elevated levels of construction. It will be appreciated that during use, the apparatus 100 drives near the edge of unsecured corrugated panels, wherein additional stability provided by the continuous tracks 124A-B translates to increased safety over other modalities of transportation. As shown in FIG. 6, a user may conveniently operate the apparatus while standing on a platform 129 located on a back side of the apparatus.

The apparatus for aligning corrugated decking 100 comprises a hydraulic pump 130 (best seen in FIG. 3) that may be housed in the main body 102 or elsewhere. The hydraulic pump 130 is configured to provide actuate the linear actuators 108A-D in the one or more arms 106A-D and the linear actuator 122 in the header 118. Hydraulic lines may extend from the hydraulic pump 130 to each of the linear actuators 108A-D, 122. The hydraulic pump 130 converts mechanical power into hydraulic energy (i.e., flow, pressure). The hydraulic pump 130 may be supported by a hydraulic drive system and can be either hydrostatic or hydrodynamic in nature.

Figure 7:
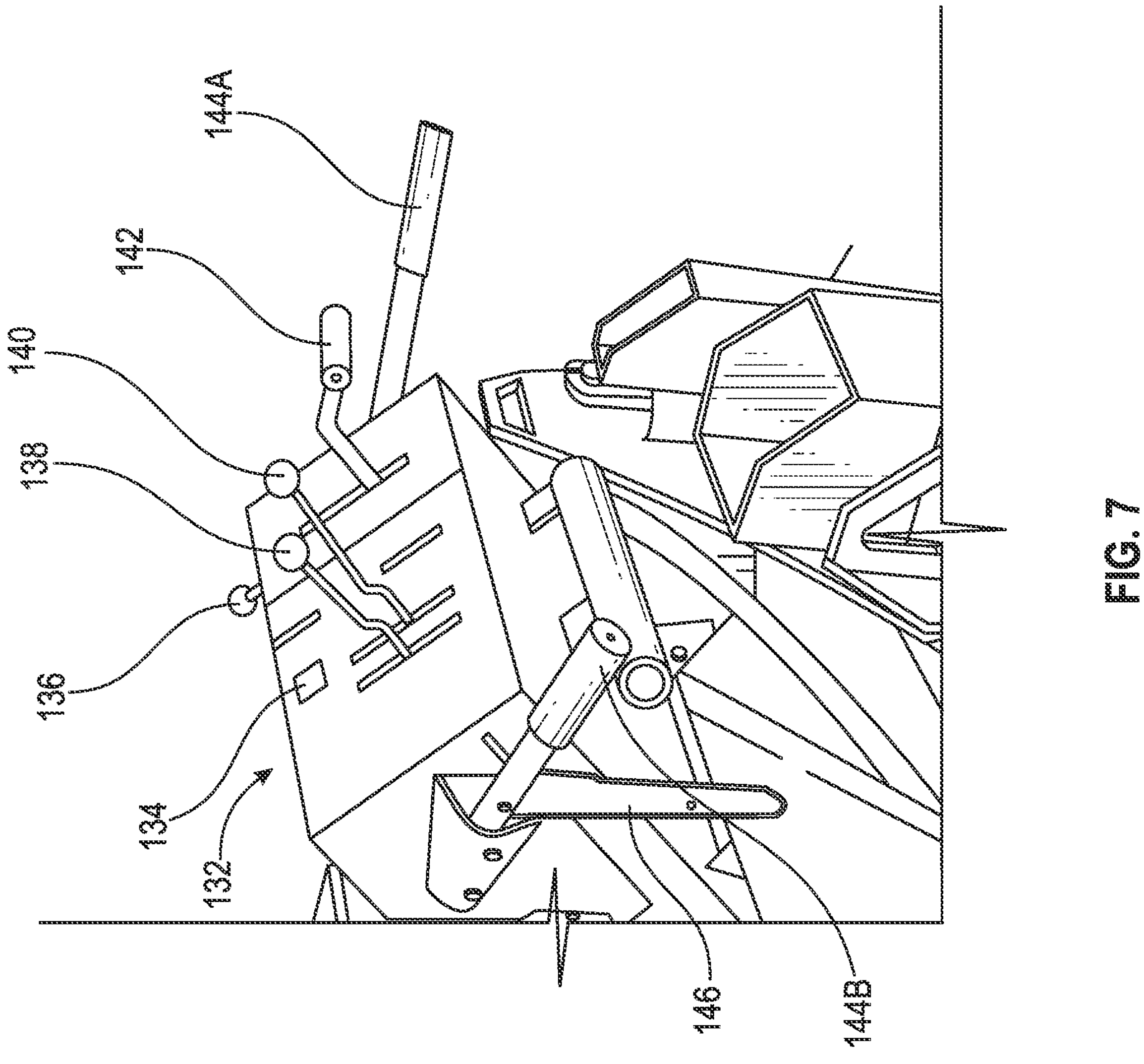
FIG. 7 is a back, left-side perspective view of a control panel.

Referring to FIG. 7, the apparatus for aligning corrugated decking 100 comprises a control panel 132 having controls (e.g., levers, buttons, dials, steering wheel, etc.) configured to move and operate the apparatus for aligning corrugated decking 100. The control panel 132, in some embodiments, comprises a keyed ignition switch 134, a throttle 136, a deck alignment control lever 138, a frame vertical adjustment lever 140, a steering control 142, one or more handlebars 144A-B, and a safety clutch 146. The keyed ignition switch 134 starts and stops the engine 128, which may be equipped with an electric starter. While described as a keyed ignition switch 134, a keyless or wireless ignition module may also be used. The deck alignment control lever 138 is configured to actuate the linear actuator 122 within the header 118, thereby bidirectionally moving the sliding corrugation plate 112 along a corrugated panel being aligned. The user can thereby align the corrugated panels with precision movement.

The throttle 136 regulates the speed of the motor, while the steering control 142 determines the direction of the continuous tracks 124A-B as the user maneuvers the apparatus 100 across the corrugated decking. While described as a lever, a steering wheel, a joystick, or other controller may be used to direct the apparatus 100. In some embodiments, the steering control 142 comprises one or more speed levers and a steering control handle. It will be appreciated that the steering control 142 may regulate the speed and direction of the continuous track drive 126. For example, pushing the speed lever of the steering control forward causes the continuous tracks 124A-B to move forward and pushing the speed lever backwards causes the continuous tracks 124A-B to move in reverse, and moving the speed lever further from neutral increases the speed in that direction. Each of the one or more continuous tracks 124A-B may be controlled by a corresponding speed lever. Turning the steering control handle causes one continuous track (e.g., 124A) to rotate at a different speed than the other continuous track (e.g., 124B), allowing the apparatus 100 to turn in a desired direction. The at least one handlebar 144A-B provides a stable hold for the user to grasp while standing on the platform 129. The safety clutch 146 further provides an additional safety measure that disengages the engine 128 of the apparatus 100 when released should the user become unstable or desire to dismount from the platform 129. In other words, a user must actuate the safety clutch 146 toward the handlebar 144A for the engine 128 to actuate the tracks 124A-B. It will be appreciated that the safety clutch 146 is not required. Further, other safety mechanisms, switches, or safety sensors may be used without departing herefrom.

Figure 8:
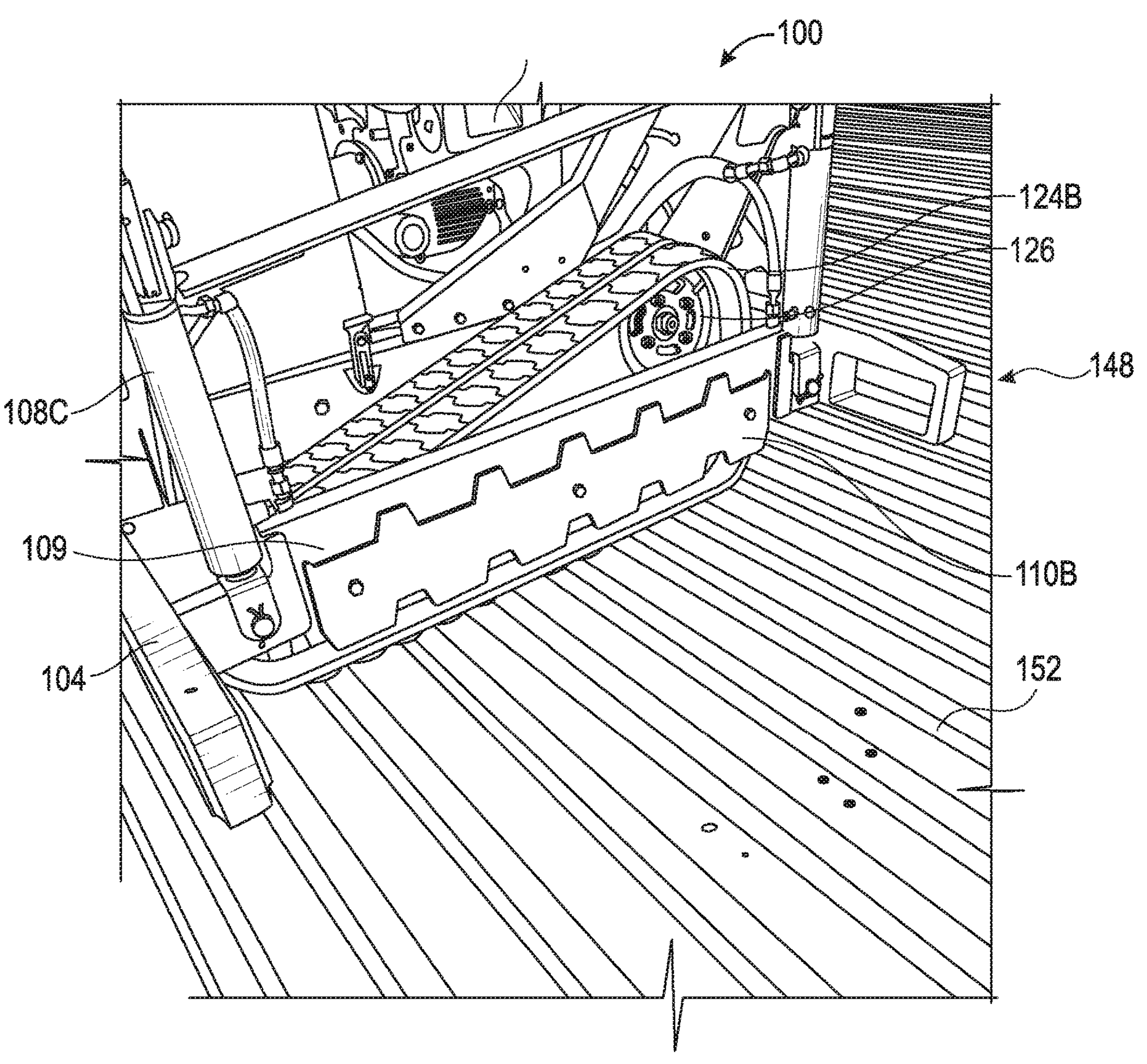
FIG. 8 is a top, left-side perspective view of an apparatus for aligning corrugated decking with an alignment frame in a first configuration.

As shown in FIG. 8, the alignment frame 104 may comprise a first configuration 148 wherein the alignment frame 104 is in a raised position (e.g., raised by the one or linear actuators 108A-D on the arms 106A-D away from the decking). The raised position ideally creates a couple of inches or more between 1) the alignment frame 104, corrugation plates 110A-B, and header 118, and 2) the decking, enabling the apparatus 100 to freely move around the decking. In other words, neither the corrugation plates 110A-B nor the header 118 are engaged with the decking (e.g., corrugated panels 152). As shown in FIG. 8, the corrugation plates 110A-B are coupled to the vertical linear actuators 108A-D, respectively, such as via a header plate 109, such that they may be raised or lowered, accordingly.

Figure 9:
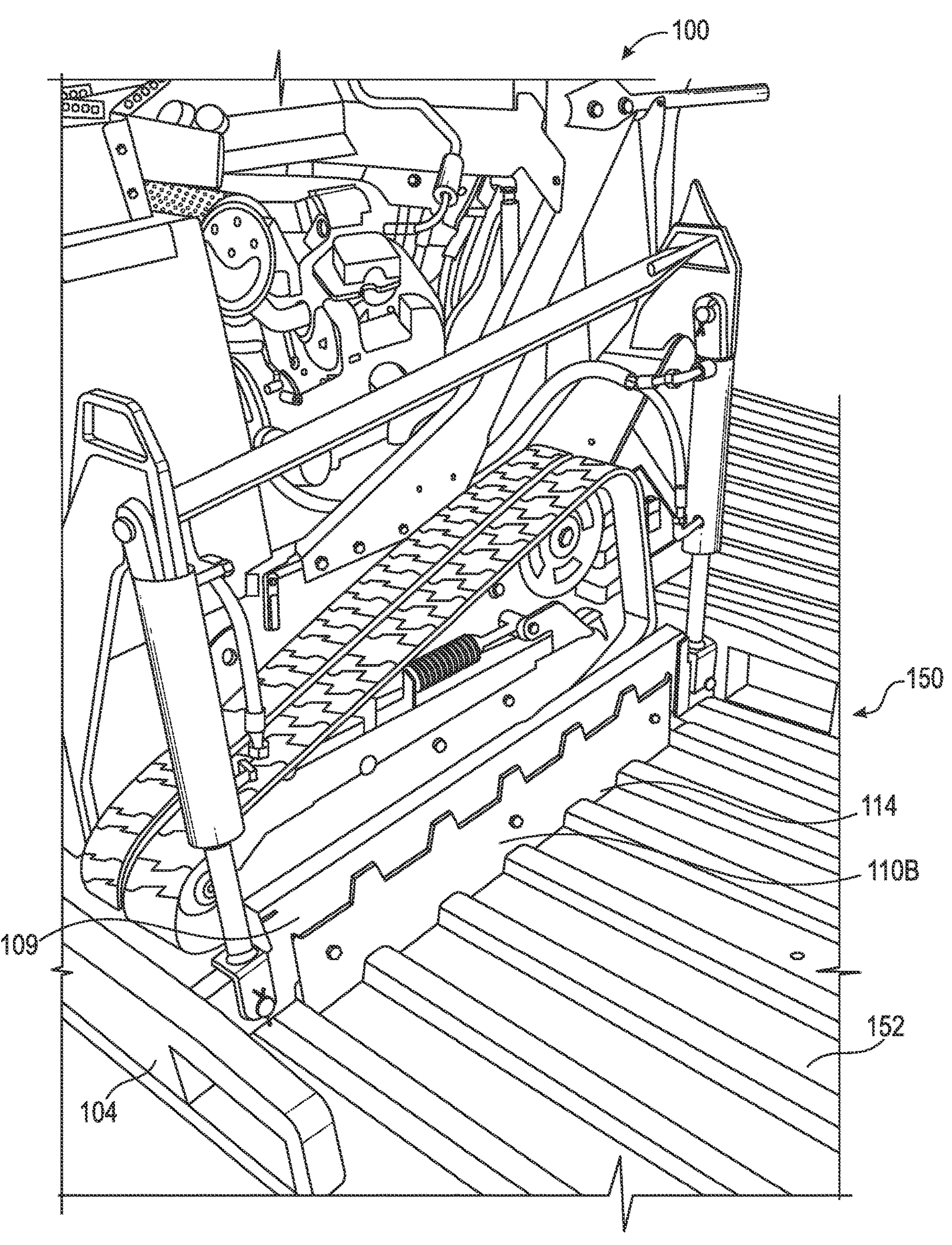
FIG. 9 is a top, left-side perspective view of an apparatus for aligning corrugated decking with an alignment frame in a second configuration.
Figure 12:
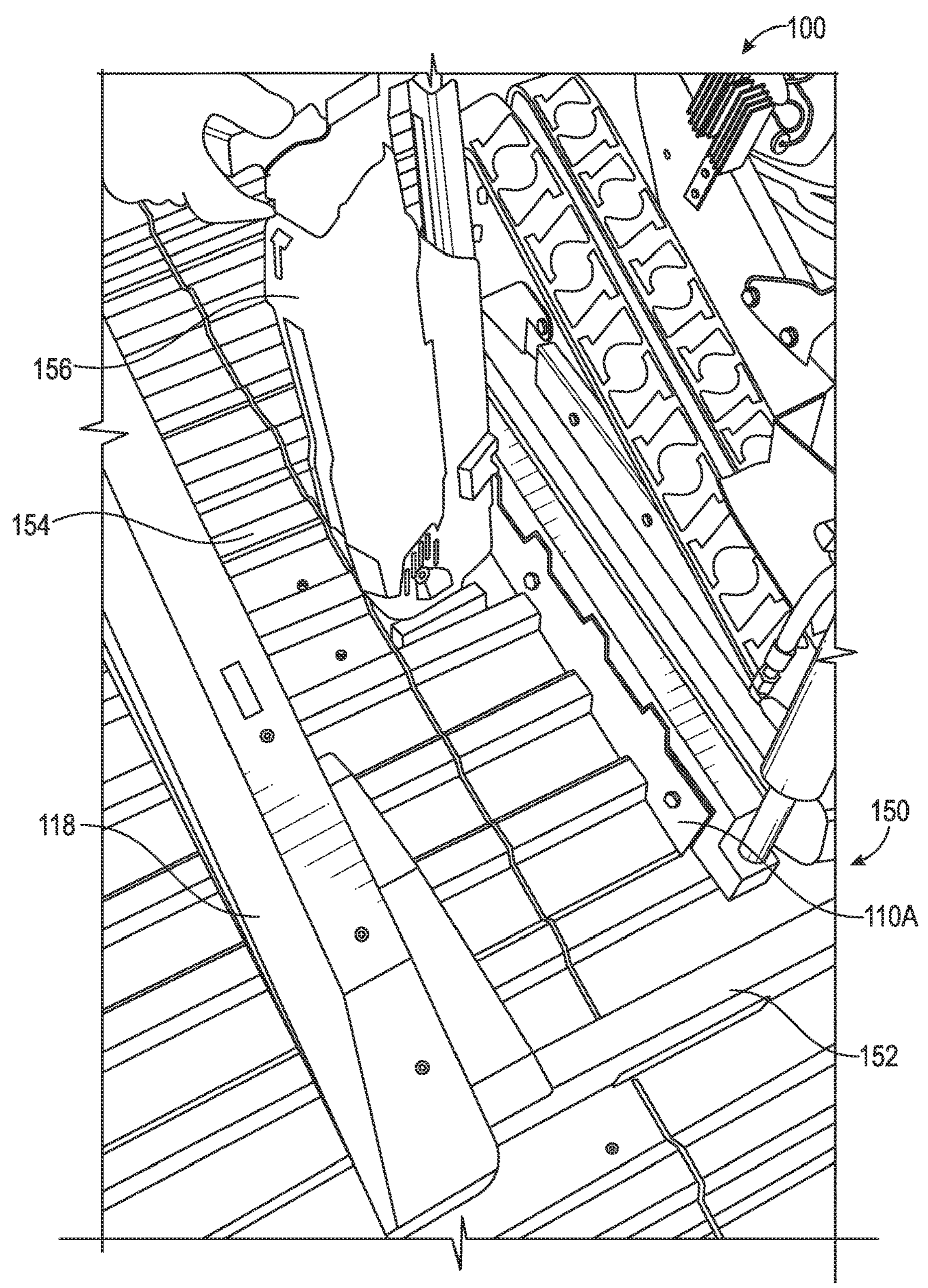
FIG. 12 is a top, right-side perspective view of a header with a powder-actuated fastening tool being used to fasten an unsecured panel and a secured panel together once in alignment.

As shown in FIGS. 9 and 12, the alignment frame 104 may comprise a second configuration 150, wherein the alignment frame 104 is in a lowered position (e.g., lowered onto the decking by the one or more linear actuators 108A-D on the arms 106A-D as controlled by the frame vertical adjustment lever 140). In the second configuration 150, the one or more vertically-adjustable corrugation plates 110A-B engage the flutes of a secured corrugated panel 152 while the sliding corrugation plate 112 of the header 118 engages the flutes of an unsecured corrugated panel 154. In the second configuration 150, the apparatus 100 is locked onto the secured corrugated panel 152 via the one or more vertically-adjustable corrugation plates 110A-B engaging the flutes of a secured corrugated panel 152, and is therefore immobile. The second configuration provides grounding for the subsequent movement of the sliding corrugation plate 112 as described next.

Figure 10:
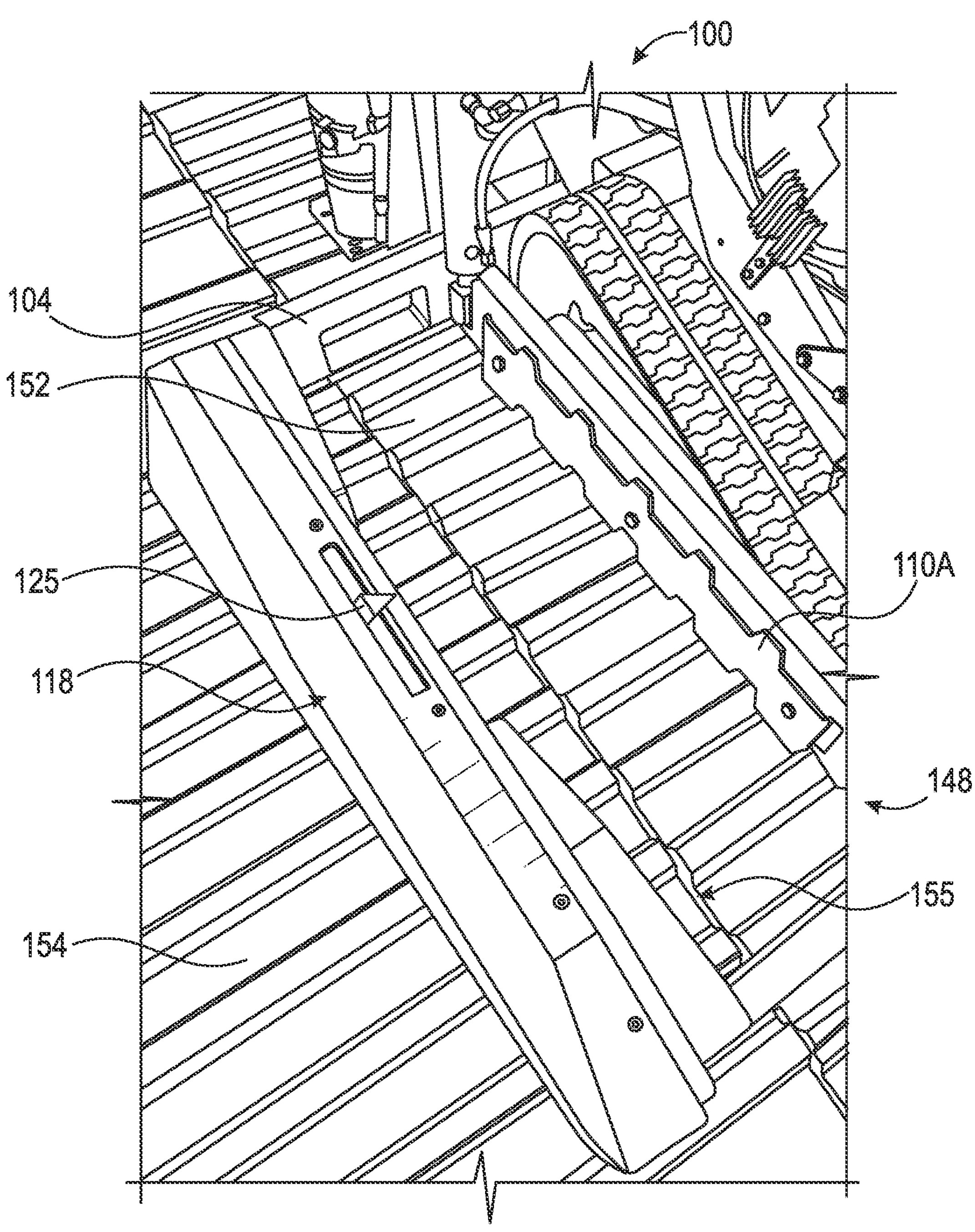
FIG. 10 is a top, right-side perspective view of an apparatus for aligning corrugated decking, wherein an unsecured corrugated panel is misaligned with a secured corrugated panel.

As shown in FIG. 10, the secured corrugated panel 152 may be misaligned with an unsecured corrugated panel 154 during the initial layout of materials such that corrugations (i.e., flutes) of each panel 152-154 do not adjoin one another to create continuous conduits between the corrugations. In addition, a gap 155 of several centimeters or more may span between the secured corrugated panel 152 and the unsecured corrugated panel 154.

Figure 11:
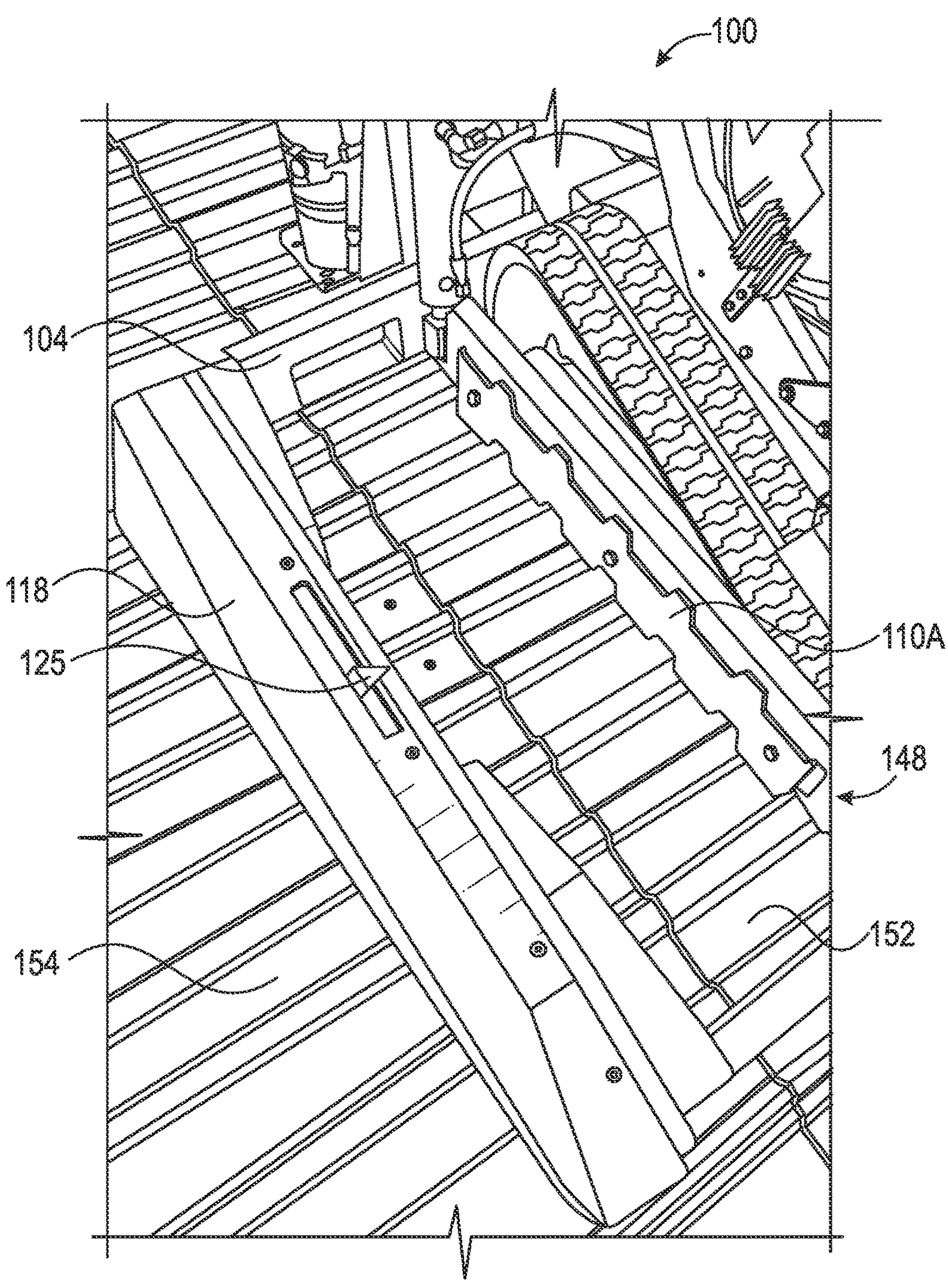
FIG. 11 is a top, right-side perspective view of an apparatus for aligning corrugated decking, wherein an unsecured panel is aligned with a secured corrugated panel.

As shown in FIG. 11, however, using the deck alignment control lever 138, the user may align the corrugations of the secured corrugated panel 152 with the corrugations of the unsecured corrugated panel 154, eliminating any gap 155 between the two panels 152, 154. In other words, as the frame 104 is lowered into the second configuration 150, the sliding corrugation plate 112 begins to align the unsecured corrugated panel 154 with the secured corrugated panel 152. In practice, the strength of the linear actuator 122 that actuates the sliding corrugation plate 112 is also sufficient to shear any temporary pins that may be holding the unsecured panel 154 during the process of realignment, thereby eliminating the need to remove those temporary pins individually by hand. Ultimately, use of the apparatus 100 creates a sealed joint in a more time efficient and safe manner than traditional methods known in the prior art.

As shown in FIG. 12, the apparatus for aligning corrugated decking 100 can be paired with standard mezzanine deck fastening procedures to ensure safety both during and after installation. For example, after the secured corrugated panel 152 and the unsecured corrugated panel 154 are properly aligned together, the user or a secondary technician may retrieve a powder-actuated fastening tool 156 (e.g., Hilti DX9 Holster or other nail gun) from a stowage location on the apparatus 100 and use it to further fasten the unsecured corrugated panel 154 to the steel support structure together with the secured corrugated panel 152. The process may then be repeated until all the corrugated panels 152, 154 are properly aligned and secured across a floor of decking (e.g., mezzanine).

The apparatus for aligning corrugated decking 100, in some embodiments, further comprises one or more bottom fork pockets 158 (FIG. 1) and dedicated lift points 160 (FIG. 1) that assist the user to lift the apparatus for aligning corrugated decking 100 safely between floors during the decking installation scope of a construction project. A crane may either hoist the apparatus 100 between floors of the structure being built using the dedicated lift points 160 or a telehandler may insert its forks within the fork pockets 158 to alternatively transfer the apparatus 100 around the jobsite. The apparatus for aligning corrugated decking 100 may further comprise a stowage compartment to house the powder-actuated fastening tool 156 and one or more corresponding compartments for pins and nails, as commonly used throughout the deck fastening process.

Figure 13:
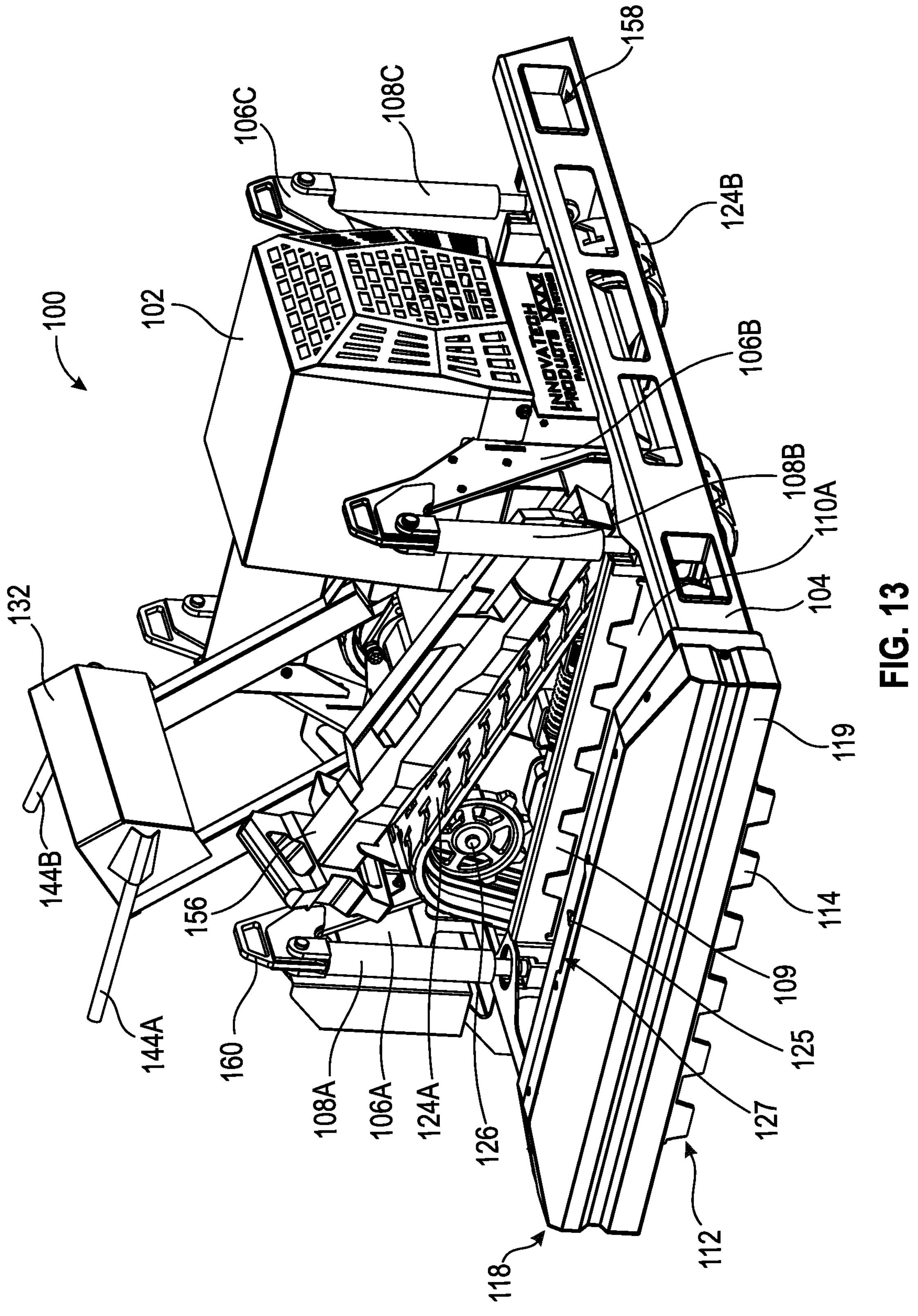
FIG. 13 is a top, right side perspective view of an apparatus for aligning corrugated decking comprising an integrated powder-actuated fastening tool.

As shown in FIG. 13, in some embodiments, the powder-actuated fastening tool 156 may be mounted on, or integrated with, the apparatus 100. When integrated, it may be automated such that the user may control its operation from the control panel 132, obviating the need for a second technician to be present or to manually operate the powder-actuated fastening tool 156 separate from the apparatus 100.

A method of aligning corrugated panels using an apparatus for aligning corrugated panels 100, according to some embodiments, comprises positioning the apparatus for aligning corrugated deck panels 100 on a secured corrugated panel 152 that adjoins an unsecured corrugated panel 154, wherein a header 118 is extended over the unsecured corrugated panel 154. The method further comprises lowering an alignment frame 104, using a frame vertical adjustment lever 140 that controls one or more vertical linear actuators 108A-D, onto both the secured corrugated panel 152 and the unsecured corrugated panel 154, engaging the secured corrugated panel 152 with one or more vertically-adjustable corrugation plates 110A-B and engaging the unsecured corrugated panel 154 with a sliding corrugation plate 112 of the header 118, and laterally moving the sliding corrugation plate 112 until the unsecured corrugated panel 154 is aligned with the secured corrugated panel 152.

Using a deck alignment control lever 138, the user can finely adjust the sliding corrugation plate 112 either forward or backwards to align the flutes of the unsecured corrugated panel 154 with the flutes of the secured corrugated panel 152, while also removing any gap 155 between the two panels 152, 154. In some embodiments, an alignment indicator 125 allows the user to visually determine the position of the sliding corrugation plate 112, allowing the user to know which direction to move the sliding corrugation plate 112 using the linear actuator 122 to align the panels 152, 154. The method of use as described is further compatible with standard mezzanine deck fastening procedures. In some embodiments, the method may further comprise securing the unsecured corrugated panel 154 and the secured corrugated panel 152 together in alignment using a powder-actuated fastening tool 156 such as a Hilti DX9 or similar nail gun. It will be appreciated that automation of the repetitive process of aligning and fastening together corrugated panels 152, 154 enables significantly improved scheduling times for the decking scope of a construction project, especially as used in large building with multiple floors.

Accordingly, the apparatus for aligning corrugated decking 100 and corresponding method of use described herein overcomes the problems identified in the prior art by automating the process of aligning and fastening together corrugated panels without the need to cut pins, doing so more efficiently and safely than traditional methods.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. An apparatus for aligning corrugated decking, comprising:

an alignment frame;

one or more vertical linear actuators configured to raise and lower the alignment frame;

one or more continuous tracks configured to maneuver the alignment frame;

an engine configured to drive the one or more continuous tracks;

at least one vertically-adjustable corrugation plate coupled to the alignment frame;

a header coupled to the alignment frame, the header comprising a horizontal linear actuator configured to horizontally adjust the sliding corrugation plate;

wherein the vertically-adjustable corrugation plate and the sliding corrugation plate are positioned parallel to one another along the alignment frame and each comprise a plurality of teeth; and wherein the plurality of teeth of the at least one vertically-adjustable corrugation plate are configured to mate with flutes of a secured corrugated panel and the plurality of teeth of the sliding corrugation plate are configured to mate with the flutes of an unsecured corrugation plate.

2. The apparatus for aligning corrugated decking of claim 1, further comprising an alignment indicator configured to signal the position of the sliding corrugation plate in relation to the alignment frame.

3. The apparatus for aligning corrugated decking of claim 1, further comprising a hydraulic pump for actuating the one or more vertical linear actuators and the horizontal linear actuator.

4. The apparatus for aligning corrugated decking of claim 1, further comprising one or more arms couplable between a main body of the apparatus for aligning corrugated decking and the alignment frame.

5. The apparatus for aligning corrugated decking of claim 4, wherein the one or more linear actuators are coupled to the one or more arms and the main body.

6. The apparatus for aligning corrugated decking of claim 1, further comprising a frame vertical adjustment lever configured to raise and lower the alignment frame via the one or more vertical linear actuators.

7. The apparatus for aligning corrugated decking of claim 1, further comprising a deck alignment control lever configured to move the sliding corrugation plate via the horizontal linear actuator.

* * * * *